Figure 1:
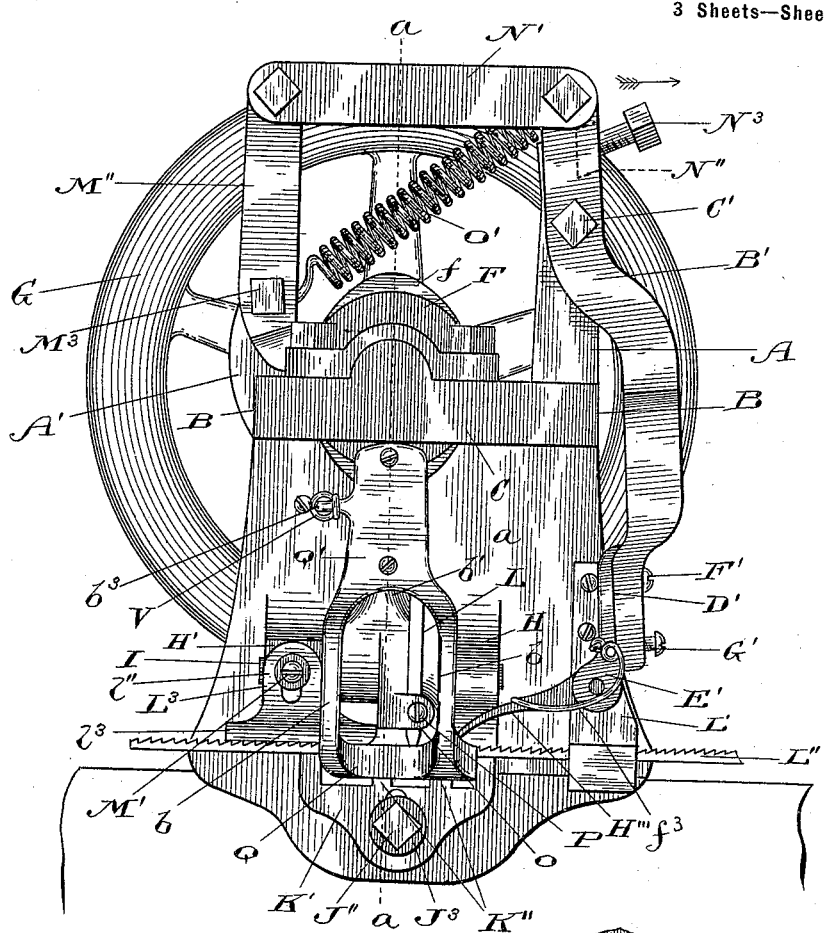

No. 615,964. Patented Dec. 13, 1898.
W. CLARK.
SAW SETTING MACHINE.
(Application filed Apr. 4, 1898.)
(No Model.) 3 Sheets—Sheet 1.

Witnesses
M. A. Westwood
J. E. Cameron

Inventor
W. Clark
by C. H. Riches
his atty.

No. 615,964. Patented Dec. 13, 1898.
W. CLARK.
SAW SETTING MACHINE.
(Application filed Apr. 4, 1898.)
(No Model.) 3 Sheets—Sheet 2.

Witnesses
Inventor

No. 615,964. Patented Dec. 13, 1898.
W. CLARK.
SAW SETTING MACHINE.
(Application filed Apr. 4, 1898.)
(No Model.) 3 Sheets—Sheet 3.
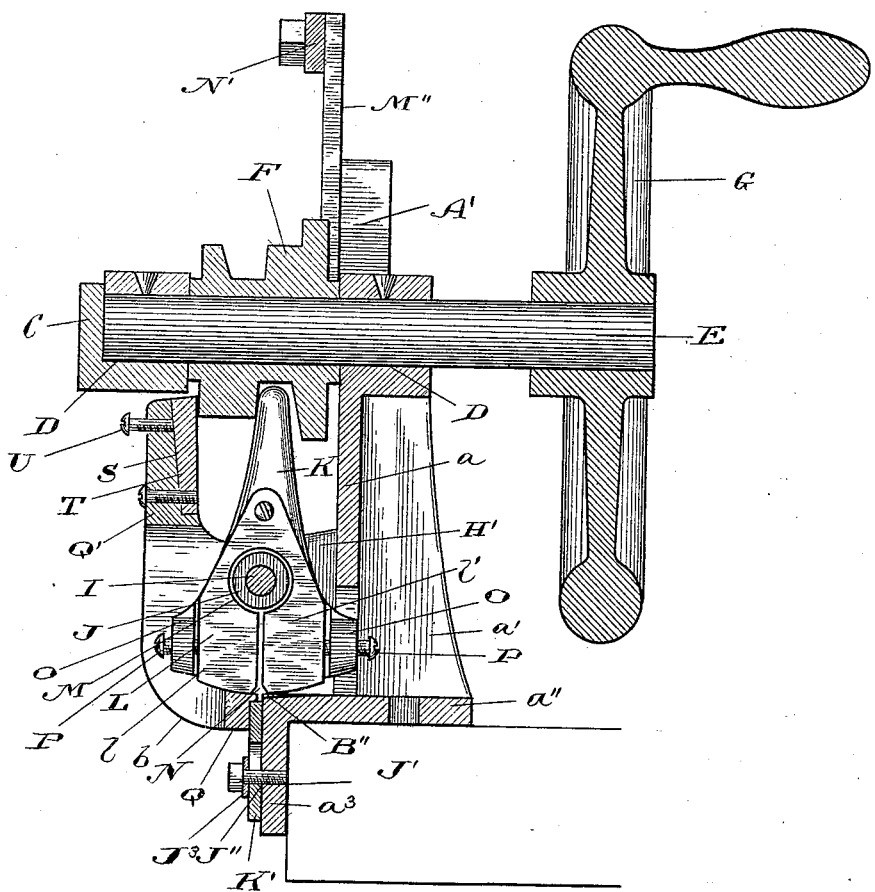
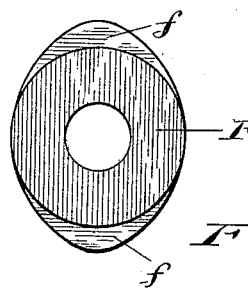
Fig. 3
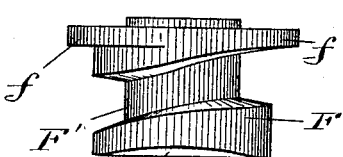
Fig. 4   Fig. 5
Witnesses
M. A. Westwood
J. E. Cannon
Inventor
W. Clark
by C. H. Riches
his Atty

UNITED STATES PATENT OFFICE.

WILLIAM CLARK, OF GALT, CANADA.

SAW-SETTING MACHINE.

SPECIFICATION forming part of Letters Patent No. 615,964, dated December 13, 1898.

Application filed April 4, 1898. Serial No. 676,489. (No model.)

*To all whom it may concern:*

Be it known that I, WILLIAM CLARK, of the town of Galt, in the county of Waterloo and Province of Ontario, Canada, have invented a certain new and useful Saw-Setting Machine; and I hereby declare that the following is a full, clear, and exact description of the same.

This invention relates to certain new and useful improvements in that class of machines employed to set the teeth of a saw regularly and alternately on opposite sides of the blade. The greater the regularity and the smaller the angle of the set of the teeth the better and more economically the saw will perform its work, and to have the teeth of the saw set in this manner is the attainment of each saw manufacturer and user.

To construct a machine which will regularly and evenly set the teeth of a saw at any required predetermined angle to the blade and to so arrange the machine that it will accurately and rapidly do its work is the broad object of the present invention, while the minor objects are, first, to provide the machine with a suitably-operated setting-die, which will automatically and regularly set the teeth alternately and in succession at opposite angles to the blade; second, to provide the machine with a vise so arranged and operated that during the setting of each tooth it will rigidly hold the blade and prevent it moving either laterally or longitudinally and after the tooth has been set to automatically release the blade and permit of the next successive tooth being fed to the setting-dies, when it will again automatically grip the blade, thus alternately gripping and releasing the saw; third, to provide the machine with a feed-arm arranged to automatically and intermittently feed the teeth af the saw to the setting-dies regularly in succession; fourth, to provide the machine with an adjustable gage to regulate the length and the angle and breadth of the set, and, fifth, to provide the machine with a guide for the blade capable of being adjusted to correspond to the gage.

The invention consists, essentially, of the device hereinafter more fully set forth, and more particularly pointed out in the claims.

Figures 7, 8:
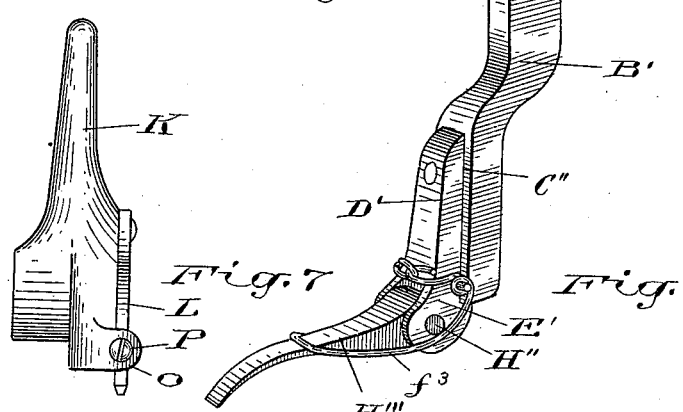
Figure 2:
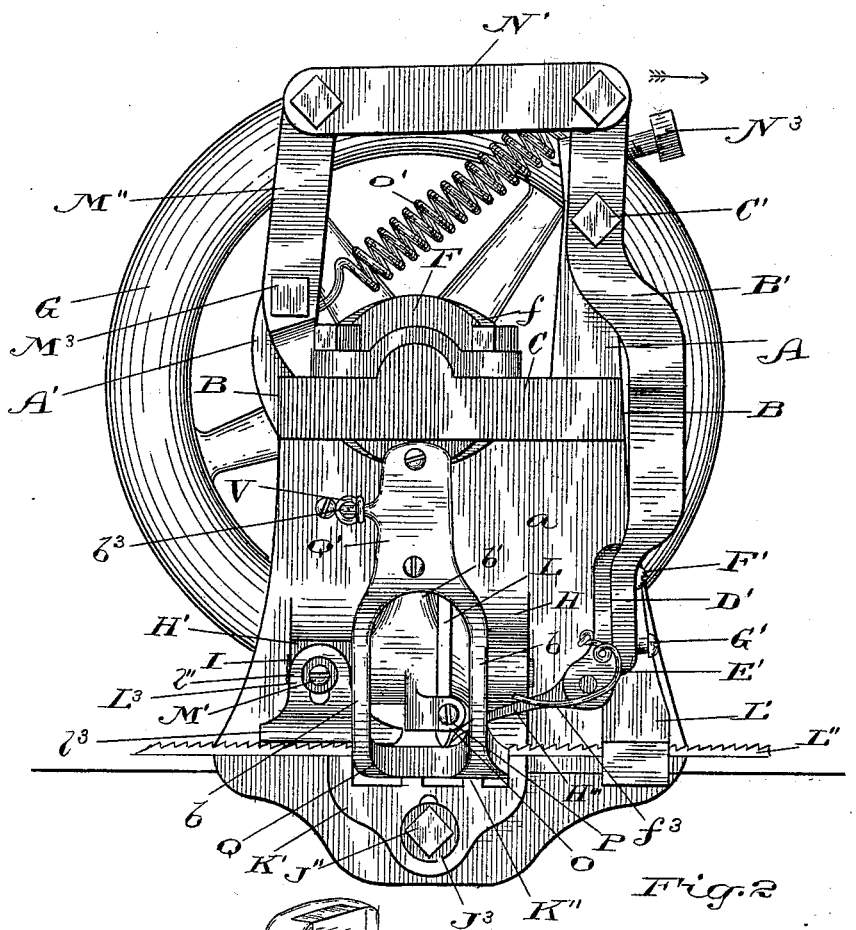
Figure 6:
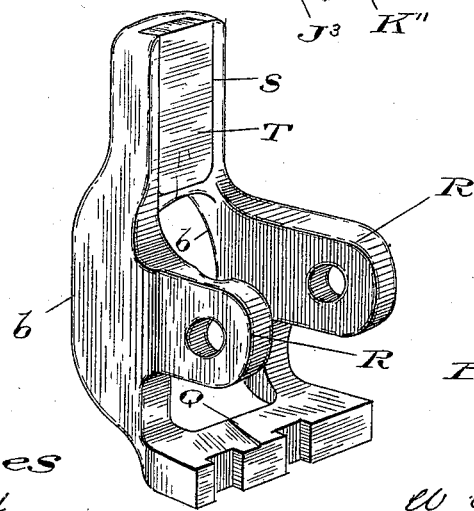

In the drawings, Figure 1 is a side elevation from the front of the machine, showing a tooth being fed to the setting-dies. Fig. 2 is a similar view showing the tooth set. Fig. 3 is a transverse sectional view on the lines $a\ a$, Fig. 1. Fig. 4 is a side elevation showing the cam for operating the feed-arm. Fig. 5 is a plan view showing the cams for operating the setting-dies and vise. Fig. 6 is a perspective view of the movable jaw. Fig. 7 is a side elevation of the setting-die and arm. Fig. 8 is a view of the feed-arm and dog.

Like letters of reference refer to like parts throughout the specification and drawings.

The frame consists of a perpendicular web $a$, side flanges $a'\ a'$, projecting rearwardly from the web $a$, and a base-flange $a''$, extending horizontally across the bottom of the web $a$ and equally on both sides thereof. Depending from the front of the base-flange $a''$ is a vertical plate $a^3$. Projecting forwardly from the outer faces of the flanges $a'$ are two arms B, and connected to the outer ends of the arms B is a cross-bar C, the top of which is in substantially the same plane as the top of the web $a$. Formed in the top of the cross-bar C and web $a$ are bearings D for a horizontal shaft E. Mounted on the shaft E between the cross-bar C and front face of the web $a$ is the cam F, which is arranged to revolve with the shaft E. The shaft E projects beyond the rear face of the web $a$, and mounted on the shaft E, at the back of the web $a$, is a hand-wheel or drive-pulley G, by means of which motion is imparted to the shaft and cam. Projecting forwardly from the front of the web $a$ are two lugs H H', located one on either side of the middle of the web and slightly above the top of the base-flange $a''$. Journaled in the lugs H H' is a rock-shaft I, and mounted on the rock-shaft I is the hub J of a vertical arm K, which engages the cam F in the manner hereinafter described. Bolted or otherwise fastened to the lower end of the side face of the arm K is a setting-die L, which consists of a piece of tool-steel, having a boss M, through which passes the rock-shaft I. The setting-die L between the boss M and its lower extremity is divided to form two independent jaws $l\ l'$, the lower edge of the meeting face of each of which is chamfered at an angle of substantially forty-five degrees in order that the chamfers will form a substantially V-shaped recess N. Connected to the front and back of the lower end of the arm K are lugs O, which overlap the side edges of the jaws $l\ l'$ and are fitted to receive set-screws.

P P represent two set-screws fitted through the lugs O O and bearing against the side edges of the jaws $l\ l'$. By means of the set-screws P P the jaws $l\ l'$ can be compressed or permitted to expand to respectively increase or diminish the width of the V-shaped recess N. By this construction the die can be adjusted to the set of the teeth.

Q represents the movable jaw of the vise. This movable jaw is connected to the forked ends $b\ b$ of a bifurcated shank $Q'$. Extending from each of the ends $b\ b$ above the jaw Q is a lug R, fitted for the shaft I. The lugs R R are mounted on the shaft I, and when so mounted the lower end of the rock-arm K and setting-die L works between the forked ends $b\ b$. The ends $b\ b$ are united by a crown $b'$, terminating in the shank $Q'$, the upper end of which engages the cam F. Formed in the inner face of the shank $Q'$ is a groove S, and located in the groove S is a block T, the lower end of which is connected to the shank $Q'$ and the upper end of which is free. Passing through the upper end of the shank $Q'$ is a set-screw U, which normally bears against the back of the block T. The purpose of the set-screw U is to press the upper end of the block T out of the groove S. The block T normally engages the cam $f''$ on the front side face of the cam F. The movable jaw is oscillated on the shaft I by the cam $f'''$ working against the block T, which moves the opposite end of the jaw toward the fixed jaw and holds it rigidly in that position during the setting of the tooth and by a spring, hereinafter mentioned, which returns the movable jaw to its normal position when the block is relieved of the pressure of the cam. The inward movement of the movable jaw is arrested by its engagement with the stationary jaw and its outward movement by the engagement of the block T with the cam $f''$. When the block T is in its normal position—that is, when it is sunk completely within the groove S—the inner face of the top of the shank Q will practically be in engagement with the cam $f''$ and will move inward and outward to its fullest extent, and the jaws will correspondingly move outward and inward, respectively. When the block has been forced out of the groove by the screw U, the extent of the inward movement of the shank is reduced, which causes a corresponding reduction of the outward movement of the movable jaw. The lower end of the block T is connected to the shank, and the spring of the metal is sufficient to cause the block to reenter the groove when the pressure of the set-screw U is released.

Projecting outwardly from one side face of the shank $Q'$ is a lug $b^3$, and connected to the lug $b^3$ and to the adjacent side face of the web $a$ is a spring V, the tendency of which is to draw the upper end of the shank $Q'$ toward the web $a$ and the movable jaw Q away from the stationary jaw of the vise. The face of the movable jaw Q is opposed to the side face of the flange $a''$ and forms with the side face of the flange the vise for the saw.

Extending upwardly from the top of each side of the web $a$ is a projection A and A', the top of the projection A extending slightly above the top of the projection A'. Pivoted to the projection A is an arm B' by a pivot-bolt C'. The pivot-bolt C' passes through the arm B' slightly below the top and enters the front face of the projection A in close proximity to the top. The arm B' is slightly bent outward to clear the outer face of the adjacent arm B and then bent downwardly and substantially parallel therewith.

The inner face of the lower end of the arm B' is channeled, and contained within the channel C'' is the shank D' of a knuckle E'. The upper end of the shank D' is fastened to the lower end of the arm B' by a screw F'. Passing through the lower end of the arm B' is a set-screw G', the inner end of which bears against the adjacent side of the shank D'. By turning the set-screw G' so as to press against the shank D' the shank is moved outwardly, and by turning the screw in the reverse direction the shank is permitted to return to the channel.

The knuckle E' is formed by forking the lower end of the shank D', and contained between the forks of the knuckle is the hub of a feed-dog $H^3$. Passing through the knuckle and hub is a pivot-pin H''. The tooth edge of the feed-dog $H^3$ normally rests on the top of the base-flange $a''$, which is provided with a stop B'' to arrest the movement of the dog when the tooth has been brought into the proper position to be operated on by the die. By moving the shank D' outward the tooth of the dog is moved closer to the stop B'' than if the shank were moved inward, thus decreasing the length of the movement of the dog, and consequently the feed of the saw, the reverse being the case when the shank is moved inward.

K' represents a vertically-movable support for the saw, which is provided with four vertical prongs K'', extending upwardly from the top of the body. The side face of the base-flange $a''$ is provided with four vertical grooves to receive the prongs K'' to allow of the prongs extending into substantially the same plane as the top of the base-flange. The plate K' is provided with a slot J', through which passes the shank of a bolt J''. The shank of the bolt J'' enters the vertical part $a^3$ of the base, to which it is rigidly connected. The head of the bolt J'' is provided with a nut and washer $J^3$, by means of which the saw-supporting plate is securely clamped in its adjusted position.

L' represents a substantially L-shaped piece of spring metal, one arm of which is bolted to the front of the web $a$ at the same side of the machine as the feed-arm B' and the other arm of which overhangs the face of the flange a''. This L-shaped piece of metal serves as a spring-guide to movably hold the saw in its normal relative position to the machine. The saw L'' is inserted between the guide L' and the adjacent face of the base-flange a''. The lower edge of the saw-blade is supported upon the prongs K'', and the teeth extend above the top of the flange a''.

L³ represents a gage consisting of a horizontal plate l³ and a vertical shank l'', having a slot through which passes a clamping-bolt M', which enters the lug H'. By means of the slot and clamping-bolt M' the gage can be adjusted vertically.

M'' represents a lever pivoted to the top of the projection A' by a pivot-bolt M³, which passes through the lever M'' between the top and bottom. Connecting the top of the lever M'' and the top of the arm B' is a link N'. The rear face of the arm B' is provided with a lug N'', having a screw-threaded bore through which passes a set-screw N³, the point of the set-screw bearing against the top of the projection A. By screwing the set-screw inward the adjacent end of the arm B' is moved outwardly in the direction indicated by arrows, causing the lower end of the arm to be moved inwardly toward the setting-dies, the point of the set-screw limiting the outward movement of the arm during the operation of the machine by engaging the top of the projection A. Connected to the top of the arm B' and to the projection A' is a spring O', which returns the arm to its starting position after being operated in the manner hereinafter set forth.

The cam F consists of a cylindrical piece of metal rigidly mounted on the shaft E and revolving therewith. At the rear end of the cylindrical piece of metal are two cam projections f f, arranged diametrically opposite each other, which during the revolution of the shaft and cam engage the adjacent end of the lever M'', forcing the adjacent end of the lever outward and the opposite end of the lever in the reverse direction, causing a corresponding movement on the upper part of the arm B' through the medium of the link N'. This movement causes the opposite end of the arm B' to be moved toward the setting-dies and causes the dog H³ to engage a tooth of the saw and move it into a position to be engaged by the V-shaped notch or recess N. When the cam has been moved into such a position by the revolution of the shaft as to disengage the cam projections from the end of the lever, the spring O' returns these parts to their normal position, so that during the continued revolution of the cam the cam projections will engage the end of the lever and cause the feed-arm to continuously and intermittently feed the saw to the setting-dies.

The cam F is provided with a cam-groove F', which engages the upper end of the rock-arm K, so that during the revolution of the cam the rock-arm K will be rocked or oscillated on the shaft I, moving the recess N first to one side of its central position and then to the other alternately, by this means setting the teeth alternately on opposite sides of the blade. The front side face of the cam is provided with a cam f'', which engages the upper end Q' of the movable jaw of the vise.

When the enlargement of the cam F engages the upper end of the shank, the lower end of the jaw is moved toward the front side face of the base-flange a'', tightly gripping the saw, which may be interposed between them. As soon as the enlargement of the cam f'' has disengaged itself from the upper end of the shank Q' the spring V draws the upper end of the shank toward the front of the web a and disengages the movable jaw from the saw, the reëngagement of the upper end of the shank with the enlargement of the cam causing the movable jaw to grip the saw firmly when it again comes into contact with the upper end of the shank.

The cams are so arranged in relation to each other that during the movement of the feed-arm B' and dog the jaw is released or opened and the rock-arm K is brought into such a position that the center of the recess N is opposite the vertical axis of the blade, so that the feed arm and dog can move the tooth to be set into the proper position for that purpose, and when the die is setting the tooth the vise will readily grip the saw-blade and prevent it moving either laterally or longitudinally, allowing the feed-arm at the same time to return to its starting position.

f³ represents a spring connected to the shank D' and bearing against the back of the feed-dog H''' to hold the feed-dog normally in a position to engage the teeth of the saw. Instead of using the feed-arm as shown in the drawings, I may, if I so desire, dispense with the use of the link and lever and arrange the upper end of the feed-arm to be engaged by the cam during its revolution.

Having thus fully described my invention, what I claim as new, and desire to secure by Letters Patent, is—

1. A saw-setting machine embracing in its construction a frame having a base, a web projecting perpendicularly from the base, a drive-shaft journaled in the web, a cam mounted on the drive-shaft, a rock-shaft journaled in the web below and at right angles to the drive-shaft, a tooth-setting mechanism consisting of an oscillating arm mounted on the rock-shaft and engaging the cam on the driving-shaft, a divided plate fastened to the arm having the outer end of each adjacent meeting face chamfered to form two oppositely-opposed dies, substantially as specified.

2. A saw-setting machine embracing in its construction a frame having a base, a web projecting perpendicularly from the base, a drive-shaft journaled in the web, a cam mounted on the drive-shaft, a rock-shaft journaled in the web below and at right angles to the drive-shaft, a tooth-setting mechanism consisting of an oscillating arm mounted on the rock-shaft and engaging the cam on the driving-shaft, a divided plate fastened to the arm having the outer end of each adjacent meeting face chamfered to form two oppositely-opposed dies, and means for adjusting the dies to each other, substantially as specified.

3. A saw-setting machine embracing in its construction a frame having a base, a web projecting perpendicularly from the base, a drive-shaft journaled in the web, a cam mounted on the drive-shaft, a rock-shaft journaled in the web below and at right angles to the drive-shaft, a tooth-setting mechanism consisting of an oscillating arm mounted on the rock-shaft and engaging the cam on the driving-shaft, a divided plate fastened to the arm having the outer end of each adjacent meeting face chamfered to form two oppositely-opposed dies, and means for adjusting the dies to each other consisting of two set-screws connected to the arm and bearing against the forked parts of the plates, substantially as specified.

4. A saw-setting machine embracing in its construction a frame having a base, a web projecting perpendicularly from the base, a drive-shaft journaled in the web, a cam mounted on the drive-shaft, a rock-shaft journaled in the web below and at right angles to the drive-shaft, a tooth-setting mechanism consisting of an oscillating arm mounted on the rock-shaft and engaging the cam on the driving-shaft, a divided plate fastened to the arm having the outer end of each adjacent meeting face chamfered to form two oppositely-opposed dies, means for adjusting the dies to each other consisting of two set-screws connected to the arm and bearing against the forked parts of the plate, a flange depending from the front of the base forming the fixed jaw of the vise, a movable jaw opposed to the fixed jaw operated by the cam on the drive-shaft, and having a recessed shank to allow of the movement of the setting-dies, and lugs projecting forwardly from the movable jaw through which passes the rock-shaft, substantially as specified.

5. A saw-setting machine embracing in its construction a frame having a base, a web projecting perpendicularly from the base, a drive-shaft journaled in the web, a cam mounted on the drive-shaft, a rock-shaft journaled in the web below and at right angles to the drive-shaft, a tooth-setting mechanism consisting of an oscillating arm mounted on the rock-shaft and engaging the cam on the driving-shaft, a divided plate fastened to the arm having the outer end of each adjacent meeting face chamfered to form two oppositely-opposed dies, means for adjusting the dies to each other consisting of two set-screws connected to the arm and bearing against the forked parts of the plate, a flange depending from the front of the base forming the fixed jaw of the vise, a movable jaw opposed to the fixed jaw operated by the cam on the drive-shaft, and having a recessed shank to allow of the movement of the setting-dies, lugs projecting forwardly from the movable jaw through which passes the rock-shaft, and an adjustable block fitted into the shank of the movable jaw to engage the cam on the drive-shaft, substantially as specified.

6. A saw-setting machine embracing in its construction a frame having a base, a web projecting perpendicularly from the base, a drive-shaft journaled in the web, a cam mounted on the drive-shaft, a rock-shaft journaled in the web below and at right angles to the drive-shaft, a tooth-setting mechanism consisting of an oscillating arm mounted on the rock-shaft and engaging the cam on the driving-shaft, a divided plate fastened to the arm having the outer end of each adjacent meeting face chamfered to form two oppositely-opposed dies, means for adjusting the dies to each other consisting of two set-screws connected to the arm and bearing against the forked parts of the plate, a flange depending from the front of the base forming the fixed jaw of the vise, a movable jaw opposed to the fixed jaw operated by the cam on the drive-shaft, and having a recessed shank to allow of the movement of the setting-dies, lugs projecting forwardly from the movable jaw through which passes the rock-shaft, an adjustable block fitted into the shank of the movable jaw to engage the cam of the drive-shaft, and a saw-rest adjustably connected to the base below the setting-dies, substantially as specified.

7. A saw-setting machine embracing in its construction a frame having a base, a web projecting perpendicularly from the base, a drive-shaft journaled in the web, a cam mounted on the drive-shaft, a rock-shaft journaled in the web below and at right angles to the drive-shaft, a tooth-setting mechanism consisting of an oscillating arm mounted on the rock-shaft and engaging the cam on the driving-shaft, a divided plate fastened to the arm having the outer end of each adjacent meeting face chamfered to form two oppositely-opposed dies, and an automatic feed for the saw consisting of an arm pivotally connected to one side of the frame, a dog pivotally connected to the arm and arranged to move upon the base to engage the teeth of the saw held by the vise, a spring connected to the arm and frame, and a cam on the drive-shaft to operate the arm, substantially as specified.

8. A saw-setting machine embracing in its construction a frame having a base, a web projecting perpendicularly from the base, a drive-shaft journaled in the web, a cam mounted on the drive-shaft, a rock-shaft journaled in the web below and at right angles to the drive-shaft, a tooth-setting mechanism consisting of an oscillating arm mounted on the rock-shaft and engaging the cam on the driving-shaft, a divided plate fastened to the arm having the outer end of each adjacent meeting face chamfered to form two oppositely-opposed dies, means for adjusting the dies to each other, an automatic feed for the saw consisting of an arm pivotally connected to one side of the frame, a dog pivotally connected to the arm and arranged to move upon the base to engage the teeth of the saw held by the vise, a spring connected to the arm and frame, and a cam on the drive-shaft to operate the arm, substantially as specified.

9. A saw-setting machine embracing in its construction a frame having a base, a web projecting perpendicularly from the base, a drive-shaft journaled in the web, a cam mounted on the drive-shaft, a rock-shaft journaled in the web below and at right angles to the drive-shaft, a tooth-setting mechanism consisting of an oscillating arm mounted on the rock-shaft and engaging the cam on the driving-shaft, a divided plate fastened to the arm having the outer end of each adjacent meeting face chamfered to form two oppositely-opposed dies, means for adjusting the dies to each other consisting of two set-screws connected to the arm and bearing against the forked parts of the plate, an automatic feed for the saw consisting of an arm pivotally connected to one side of the frame, a dog pivotally connected to the arm and arranged to move upon the base to engage the teeth of the saw held by the vise, a spring connected to the arm and frame, and a cam on the drive-shaft to operate the arm, substantially as specified.

10. A saw-setting machine embracing in its construction a frame having a base, a web projecting perpendicularly from the base, a drive-shaft journaled in the web, a cam mounted on the drive-shaft, a rock-shaft journaled in the web below and at right angles to the drive-shaft, a tooth-setting mechanism consisting of an oscillating arm mounted on the rock-shaft and engaging the cam on the driving-shaft, a divided plate fastened to the arm having the outer end of each adjacent meeting face chamfered to form two oppositely-opposed dies, an automatic feed for the saw consisting of an arm pivotally connected to one side of the frame, an adjustable block connected to the lower end of the arm, a spring-operated dog pivotally connected to the block and arranged to move upon the base to engage the teeth of the saw held by the vise, substantially as specified.

11. A saw-setting machine embracing in its construction a frame having a base, a web projecting perpendicularly from the base, a drive-shaft journaled in the web, a cam mounted on the drive-shaft, a rock-shaft journaled in the web below and at right angles to the drive-shaft, a tooth-setting mechanism consisting of an oscillating arm mounted on the rock-shaft and engaging the cam on the driving-shaft, a divided plate fastened to the arm having the outer end of each adjacent meeting face chamfered to form two oppositely-opposed dies, means for adjusting the dies to each other, an automatic feed for the saw consisting of an arm pivotally connected to one side of the frame, an adjustable block connected to the lower end of the arm, a spring-operated dog pivotally connected to the block and arranged to move upon the base to engage the teeth of the saw held by the vise, substantially as specified.

12. A saw-setting machine embracing in its construction a frame having a base, a web projecting perpendicularly from the base, a drive-shaft journaled in the web, a cam mounted on the drive-shaft, a rock-shaft journaled in the web below and at right angles to the drive-shaft, a tooth-setting mechanism consisting of an oscillating arm mounted on the rock-shaft and engaging the cam on the driving-shaft, a divided plate fastened to the arm having the outer end of each adjacent meeting face chamfered to form two oppositely-opposed dies, and means for adjusting the dies to each other consisting of two set-screws connected to the arm and bearing against the forked parts of the plate, an automatic feed for the saw consisting of an arm pivotally connected to one side of the frame, an adjustable block connected to the lower end of the arm, a spring-operated dog pivotally connected to the block and arranged to move upon the base to engage the teeth of the saw held by the vise, substantially as specified.

13. A saw-setting machine embracing in its construction a frame having a base, a web projecting perpendicularly from the base, a drive-shaft journaled in the web, a cam mounted on the drive-shaft, a rock-shaft journaled in the web below and at right angles to the drive-shaft, a tooth-setting mechanism consisting of an oscillating arm mounted on the rock-shaft and engaging the cam on the driving-shaft, a divided plate fastened to the arm having the outer end of each adjacent meeting face chamfered to form two oppositely-opposed dies, an automatic feed for the saw consisting of an arm pivotally connected to one side of the frame, a dog pivotally connected to the arm and arranged to move upon the base to engage the teeth of the saw held by the vise, a spring connected to the arm and frame, a lever pivoted to the opposite side of the frame operated by the cam on the drive-shaft, and a link uniting the lever and arm, substantially as specified.

Toronto, March 14, A. D. 1898.

WM. CLARK.

In presence of—
M. A. WESTWOOD,
C. H. RICHES.